United States Patent [19]

Smith

[11] 4,246,443

[45] Jan. 20, 1981

[54] TELEPHONE INTERFACE CONTROLLER FOR UNATTENDED OPERATION

[76] Inventor: Edward D. Smith, 2200 S. Ocean Blvd. Apt. PH-7, Delray Beach, Fla. 33444

[21] Appl. No.: 945,313

[22] Filed: Sep. 25, 1978

[51] Int. Cl.$^3$ .......................................... H04M 11/00
[52] U.S. Cl. .................................. 179/2 R; 179/1 HF
[58] Field of Search ........... 179/2 R, 2 A, 2 E, 2 EA, 179/1 HF, 1 VC, 81 B, 2 C; 325/22; 307/252 W, 308

[56] References Cited

U.S. PATENT DOCUMENTS

| | | | |
|---|---|---|---|
| 3,586,787 | 6/1971 | Vogelman | 179/2 EA |
| 3,748,496 | 7/1973 | Hedin et al. | 179/1 VC X |

*Primary Examiner*—Raymond F. Cardillo, Jr.
*Assistant Examiner*—Joseph A. Popek

*Attorney, Agent, or Firm*—Malin & Haley

[57] ABSTRACT

A communication interfacing device which allows for automatically coupling two diverse communication systems which transmit audio information. The device further includes a telephone answering circuitry which allows a telephone to be interfaced automatically with radio transceivers, computers, and intercoms such that the device will automatically connect and disconnect incoming telephone calls to and from such devices. The system employs voice responsive controllers which affect the timing cycles of individual communication channels to allow for a two-way conversation between remote stations utilizing diverse communication devices. The controllers allow for discriminating between incoming and outgoing calls on a priority basis such that channel switching modes cannot be interrupted until a conversation on the priority channel or an audio signal ceases.

5 Claims, 3 Drawing Figures

4,246,443

TELEPHONE INTERFACE CONTROLLER FOR UNATTENDED OPERATION

BACKGROUND OF THE INVENTION

This invention relates generally to a device which allows for interfacing two audio communication systems which allows especially for coupling together two diverse systems such as a telephone and a radio transmitter and receiver, and includes automatic control such that incoming and outgoing calls may be discriminated on a priority basis which will be maintained until the lack of an audio signal on a particular channel for a predetermined amount of time.

Telephone answering devices are known in the prior art which allow for a telephone to be automatically answered such that the caller may leave a recorded message or the like. Other interface systems have been devised which allow for elaborate coupling between electrical communication systems that are quite complex in construction and expense.

The present system provides a relatively non-complex economically constructable interface system which is readily installed for use between devices such as a telephone and a radio transceiver such as a CB, which allows for two-way conversation between such diverse systems.

BRIEF DESCRIPTION OF THE INVENTION

A plurality of electronic timers are incorporated into the design and are hereinafter referred to as controllers. The requirements for the said controllers are such that a change from a quiescent output level to another output level shall occur at a time a suitable threshold voltage is applied to trigger the controller time cycle. The output pulse produced thereby shall be in the form of a square wave and the pulse width thereof shall be determined by the rate that a capacitor is allowed to charge to a predetermined voltage. Following production of the said output pulse the controller shall automatically reset to its quiescent condition at a time coincidental with the trailing edge of the output pulse. Such a controller can be constructed by the use of discrete components and can be described as having the characteristics of a one shot multivibrator, also, is commonly referred to as a monopulse RC timer. However, in consideration of the many inherent advantages of integrated circuits, the commonly used type 555 integrated circuit timer made by Signets, Inc. and others is illustrated on the schematic diagram of FIG. 1 and also on the simplified block diagram of FIG. 2. Since the type 555 timer has been disclosed previously and its features are not claimed herein, the internal circuit details of the type 555 timer are not shown or necessary to illustrate the invention herein disclosed.

For the purpose of driving speakers and to provide signals to the control circuitry a first audio channel amplifier is used for the telephone incoming channel hereinafter referred to as channel "A" and a second audio channel amplifier is used for the telephone outgoing channel hereinafter referred to as channel "B" respectively.

To attain voice-controlled timing cycles of the controllers, audio drive signals are provided from each channel amplifier to actuate solid-state switches, described in more detail later. These respective switches are connected to trigger controllers and also to continuously extend the output timing pulses relative to the length of each channel "A" and "B" conversation, respectively.

When an output signal is applied from a channel amplifier to an aforementioned solid-state switch connected thereto, one of the channel controller circuits takes command, dependent upon which channel signal was first present. This action triggers the related channel controllers and their timing cycles commence. If the audio signal applied thereto is of very short duration, the resultant timing cycle will terminate at the end of a predetermined time. However, if the audio signal voltage persists beyond the predetermined pulse duration time, the controller charging capacitor of one or more of the specific channel controller circuit will be prevented from reaching the threshold voltage by means of a solid-state switch connected across the said charging capacitor due to activation of the solid-state switch while audio signals are present from its related channel amplifier. This extension of the timing cycle will continue until the voice-control voltage is removed from the said solid-state switch, at the end of a conversation.

As discussed in more detail later, the channel controllers are interlocked by means of logic gating circuits in such a manner that only one channel can operate at a time. Thus it can be seen that the respective channel controllers maintain channel dominance until there is a reasonable pause in the conversation. When the system has been sequenced to an operational mode and both audio channels are quiescent, either channel will be allowed to take control on a priority basis.

The interlocked channel switching and blanking system, aforementioned, is further enhanced by a sequential time delay feature in the channel "B" control circuit. At a time when the circuit parameters allow channel "B" to take control, channel "A" is thereby blanked a short interval ahead of time that channel "B" output signal is allowed to be coupled to the telephone line. This design feature removes the possibility of channel control indecision which would otherwise be evident. Without this advanced blanking characteristic, audio signals that happen to occur at the same time in both channels would tend to cause oscillatory action between the channel control circuits. This same type of indecision would also be evident due to electrical interference produced by switching currents of both channel control circuits.

Furthermore, when the invention hereby disclosed is used to interface a standard telephone with other communications' equipment, it is essential to provide the previously mentioned switching means enabling advanced blanking of the incoming telephone channel prior to the time that the outgoing message is coupled to the telephone line. Otherwise, discriminate channel switching would be thwarted due to the fact that when an outgoing message is applied to the telephone handset microphone (or direct to the telephone list) the same signal appears as an incoming signal via the telephone system. Hence, the device could not distinguish between an incoming and an outgoing message. Thus, it can be appreciated that the advanced blanking of the incoming message channel, as devised for this invention permits the discrete channel switching method in applications which would not be feasible otherwise.

Whereas it is now obvious that channel "A" requires blanking prior to the operational sequence which allows an outgoing message from channel "B" this invention also provides for the extension in time of the channel "B" blanking for a short interval after channel "A" has relinquished control. This feature is necessary to prohibit unwanted signals from initiating a response of the channel "B" controller circuit. These unwanted signals can be produced in the form of spurious spikes that occur with some types of ancillary devices when these said devices are actuated. This form of deleterious interference is particularly evident with the use of some intercoms and radio transceivers at a time when they are switched from transmit to receive modes. If provision were not made, as in this invention, such spurious signals would falsely trigger the channel "B" controllers in the same manner as a voice-reply signal, in which case the device would follow the operational sequences without the presence of a voiced-reply.

In order to accomplish the unattended operation feature of this invention, in addition to the channel controllers heretofore described, another monopulse RC timer is used to perform the function of main system sequence timer, time out and reset device, hereinafter referred to as the main system timer. As in the case of the channel controllers, the type 555 integrated circuit timer is used as a main system timer. In much the same manner as described for the channel controllers the main system timer incorporates a system of extending its predetermined output pulse width by means of a solid-state shorting switch connected across its charging capacitor. However, in the case of the main system timer it is not directly controlled by audio signals but rather it is triggered by the first occurring pulse of the channel "A" controller circuit. Also, output pulses from either channel controllers are applied via logic gates to the solid state shorting switch connected across the said charging capacitor of the main system timer. Since the controller output pulses are positive, such pulses from either channel will cause a positive output from an AND gate to be applied to the gate of the SCR shorting switch thus causing the SCR switch to conduct and discharge the main system timer charging capacitor. By this means it can be seen that the main system timer is prevented from timing out as long as either channel controllers are not quiescent.

When the main system timer is first triggered it does two things, firstly, its positive output pulse is applied to the base of a switching transistor to place the telephone switch actuator circuit on standby awaiting a called subscriber response. Secondly, it provides a positive pulse via another AND gate which allows the channel "B" controllers to operate in the event of an audio response.

As described heretofore, the output pulse durations of the primary channel controllers are extended beyond the period of conversation of each respective channel. Since the said output pulses are applied via logic gates to the main system timer SCR shorting switch, the main system timer cannot complete its predetermined cycle until after the said channel controllers attain their low output state, which condition occurs after all conversation ceases. The predetermined pulse width of the main system timer is nominally 12 seconds, but, as explained, can be indefinitely extended during the period that audio signals are present in either channel. When no audio signals are present for more than 12 seconds, the timer resets the device to its standby mode under which condition the channel "B" controller circuit is disabled and power is removed from the telephone hookswitch actuator circuit thus placing the telephone on-hook. By the means described heretofore, the necessity of external supervisory control signals are eliminated, thus it can be seen that this interface device can operate equipment on a hands-free and unattended basis. However, provision is made in this invention to override the hookswitch actuator circuit as mentioned previously, so that the operator of a remote device can effect an on-hook condition, if desired.

When a "ring" occurs the main sytem timer provides power to the hookswitch actuator circuit, as described above, but at that point the telephone will remain on-hook until the called subscriber responds. If a response occurs the resultant audio signal voltage from channel "B" triggers the channel "B" controllers and the resultant positive output pulse from the primary channel "B" controller circuit is applied to gate the SCR switch in the hookswitch circuit resulting in an off-hook condition.

The design of this invention is such that the operation of the telephone switch, by means of the electromechanical actuator, cannot occur to place the telephone off-hook until firstly, the device is placed in its Alert Mode by a "ring" and secondly, only if a called subscriber responds to the "ring", unless these features are overridden by a remote operator, as mentioned previously.

Unless provision is made, as in this invention, a dial tone signal would have the same effect as a voice signal and would prevent the main system timer from terminating the operating cycles and resetting the device to the standby mode. This situation would hold the telephone in an off-hook condition unnecessarily. Consequently, this invention overcomes this objectionable feature by the incorporation of a dial tone decoder. The said decoder illustrated in FIGS. 1 and 2 is a commonly used integrated circuit device designated as type 567 and is readily available from various sources. Since no claims are made herein relative to the internal characteristics of the type 567 decoder, none of its details are shown herein or required to describe the invention hereby disclosed. The external components for the said decoder are selected to allow the decoder to respond to a dial tone frequency. The output of the type 567 decoder in its quiescent condition is high level and switches to low level upon application of a dial tone frequency. Since dial tone frequencies are also present as components of speech, provision is made in this invention to make ineffective any dial tone frequency having a duration less than the 12 second predetermined time cycle of the main system timer. This feature is accomplished by connecting the output of the decoder to an AND gate. This is the same AND gate mentioned previously which is used to convey a positive pulse to the gate of the SCR switch in the main system timer circuit to interrupt its timing function each time the primary channel "A" or "B" controllers are active. Reference to the schematic diagram of FIG. 1 or the simplified block diagram of FIG. 2 will reveal circuitry whereby the presence of a dial tone frequency will prevent the said AND gate connected between the decoder and the main system timer from providing positive gating to the SCR shorting switch. If the dial tone frequency signal is present for a period longer than the 12 second predetermined time cycle of the main system timer, it can now be seen that the main system timer will thus be allowed to complete its normal cycle and will time out and reset the device. The shorter duration dial tone frequencies present in the voice signals would not disable the said AND gate for a sufficient time to allow the main system timer to time out.

In the application illustrated in FIGS. 1 and 2, a separate microphone and speaker is used. However, if a transfer switch is provided it can be actuated by the output pulse from the primary channel "A" controller and in this manner a speaker/microphone combination can be used. In either case, acoustic feedback cannot occur due to the discrete channel switching and blanking features of this invention hereby disclosed. Thus, the system allows for remote operation or hands-free answering of a telephone on a voice-actuated basis with no possibility of feedback between channels.

OBJECTS OF THE INVENTION

One object of this invention is to provide an electronic circuit configuration, including controllers having parameters and interlocking characteristics such that switching of communications channels can be accomplished on a hands-free basis.

Another object is to provide a completely hands-free voice-controlled telephone answering or intercom system whereby no manual switch actuation is required either at the beginning or end of the two-way conversation.

Also, an object of this invention is to provide a versatile automated controller that can be used to interface a variety of communications devices without alteration thereto.

A further object of this invention is to include design characteristics such that it can be used to interface a standard telephone with such devices as radio transceivers, computors, intercoms, etc. and more particularly this invention relates to controllers which have facilities to sense a "ring" and provided that the called subscriber responds, to automatically connect and disconnect calls to and from such devices.

Another object of this invention is to enable the said controllers to discriminate between incoming and outgoing calls, on a priority basis, such that the channel switching modes cannot be interrupted until a conversation in the channel that was allowed priority control ceases.

A still further object of this invention is to provide an automatic switching system that will enable the switching of ancillary equipment in synchronism with the aformentioned channel switching sequences.

Also, another object is to provide the controllers with means to restore the telephone to its on-hook condition at the end of the conversation, regardless of whether it was from the caller or the called subscriber, with no external supervisory control signal except as otherwise provided hereinafter.

An additional object is the facility to sense a "disconnect" and in such an event to enable the controller circuit to place the telephone on-hook.

Another object is to provide means whereby an operator of a remote device, interfaced by this invention to a telephone, can initiate a land line call and if necessary, may abandon the call and place the telephone on-hook by overriding the automatic features of this invention.

Whereas the method illustrated for the purpose of this disclosure shows transducer coupling to the telephone line and acoustic coupling of ancillary equipment, the invention is not restricted thereto. Equal performance can be attained by conventional directly-connected signal voltage means.

For the purpose of describing this invention, an application adapted specifically for use in conjunction with a telephone is illustrated hereinafter. However, this invention is not restricted to telephone usage and can be adapted for the purpose of switching other forms of communications devices by voice-actuation such that a two-way conversation can be carried out between two stations on a hands-free basis at both channel station locations.

PREFERRED EMBODIMENT OF THE INVENTION

Figure 1:
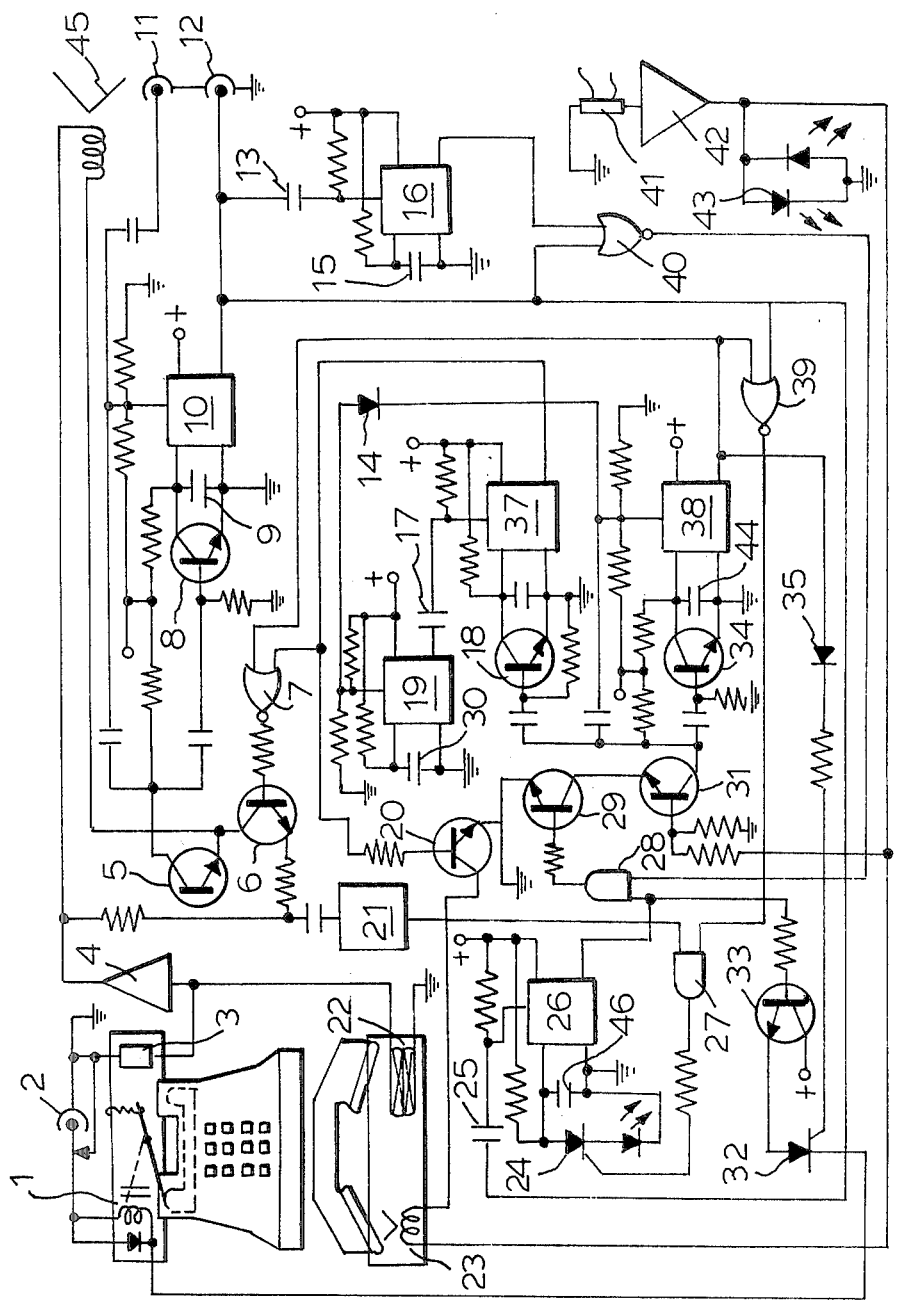
FIG. 1 is a detailed schematic diagram of the invention which shows a typical application whereby it is used in conjunction with a telephone, transducer coupled thereto.
Figure 2:
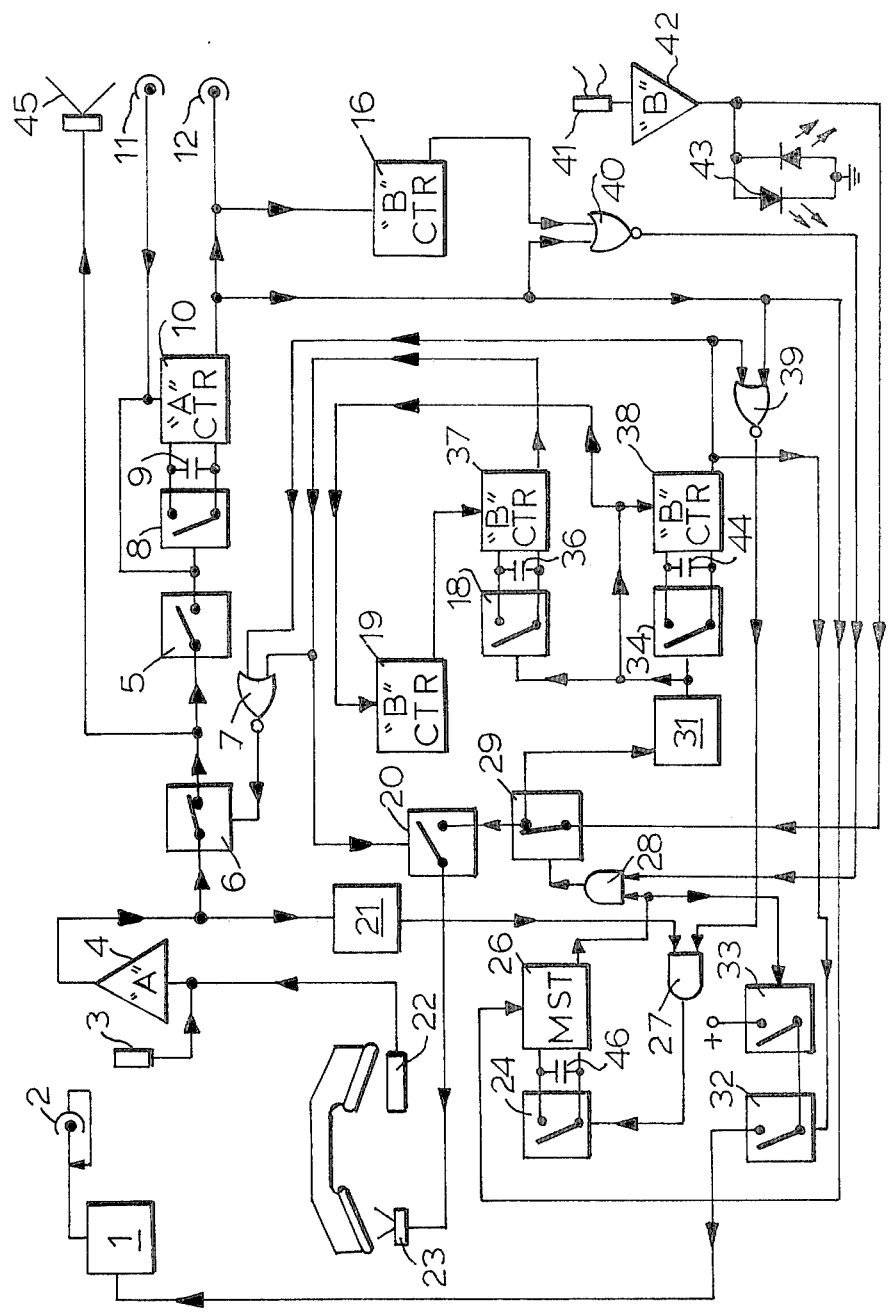
FIG. 2 is a simplified block diagram of FIG. 1.
Figure 3:
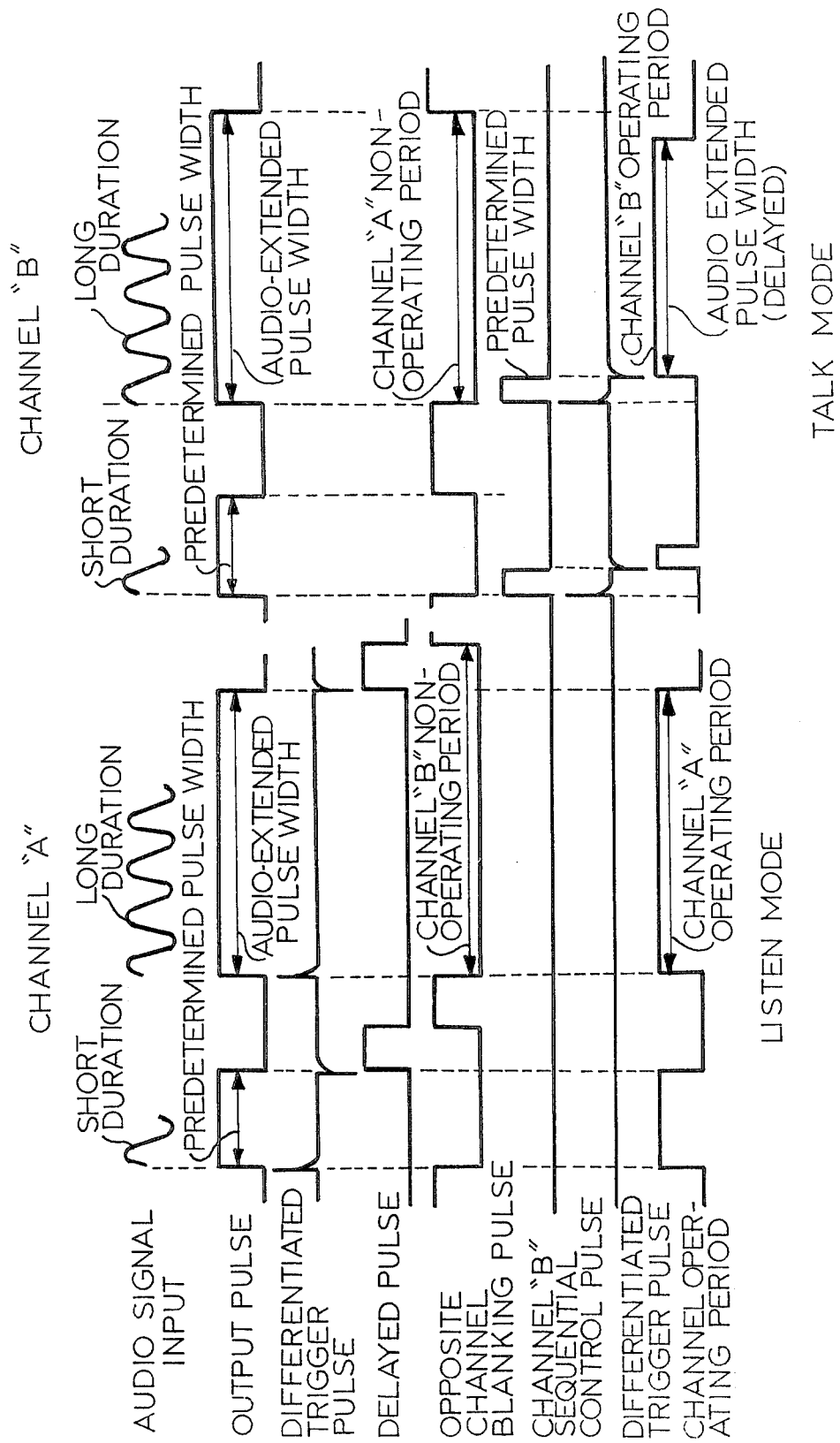
FIG. 3 illustrates the timing relationship of input versus output pulses for various controllers of both channels.

Whereas in the detailed description that follows, reference is made to the numeral identification of FIG. 1. The reader will find it useful to also refer to the simplified block diagram of FIG. 2 and the timing relationship shown in FIG. 3, as the detailed description of operation is studied. It will be noted that in the interest of simplicity, some minor components are omitted in the simplified block diagram. However, signal paths are indicated in FIG. 2.

There are five modes of operation for the specific application illustrated in FIGS. 1 and 2 as hereinafter described, namely, STANDBY, ALERT, TALK, LISTEN and RESET. These modes of operation are described in detail as follows:

STANDBY MODE

When the device is readied for use, the telephone handset is removed from the telephone base and placed in the receptable provided on the interface device. The ELECTROMECHANICAL ACTUATOR 1 is then placed on the telephone base to replace the handset. Since this actuator has spring-loaded means to depress the telephone switch posts, the telephone is maintained in its on-hook condition during the STANDBY MODE.

At the time power is switched "on" the circuit controllers commence their respective timing cycles, at the end of which they reach their quiescent condition with their respective outputs at 0, hereinafter referred to as low level, where they remain until triggered. Under these conditions of low level output, the NOR GATES 7 and 40, which are connected to the channel "B" and "A" controllers respectively, invert the said controller low level output to high level. Consequently, NOR GATE 7 which receives its input from the channel "B" control circuit thus provides a positive voltage to the base of TRANSISTOR BLANKING SWITCH 6 allowing it to conduct and in turn activate the channel "A" control circuit and SPEAKER 45. However, the opposite channel "B" TRANSISTOR BLANKING SWITCH 29 is non-conductive since the positive output from NOR GATE 40 is applied to AND GATE 28, the output of which is maintained at a low level until it receives a positive voltage at its input from the MAIN SYSTEM TIMER 26, which during the STANDBY MODE has a low level output. Thus it can be seen that during the STANDBY MODE the channel "A" AMPLIFIER and related controllers are operational while the channel "B" is nonoperational. Also, since the MAIN SYSTEM TIMER 26 has not yet been triggered, its low level output maintains TRANSISTOR POWER SWITCH 33 nonconductive. Under these conditions the telephone remains on-hook since no power is available to SCR SWITCH 32 from TRANSISTOR POWER SWITCH 33.

Also, during the STANDBY MODE a low level output is present at the ANCILLARY EQUIPMENT CONTROL JACK 12 which maintains the said ancillary equipment in its receive mode. Hereinafter it is assumed that a radio transceiver is interfaced to a telephone by this invention.

ALERT MODE

When the telephone "rings" the RING SENSOR 3 applies an input signal to the channel "A" AMPLIFIER 4. The resultant output signal from this amplifier is applied to TRANSISTOR TRIGGER SWITCH 5 and since TRANSISTOR BLANKING SWITCH 6 is conductive, the "ring" is audible at SPEAKER 45 and the TRANSISTOR TRIGGER SWITCH 5 provides a trigger for CONTROLLER 10. The output of CONTROLLER 10 immediately switches to its high level which is applied via JACK 12 to the ancillary device connected thereto thus placing the said ancillary device in its transmit mode. Assuming the ancillary device is a radio transceiver or similar device, the "ring" is thereby transmitted to a remote station by means of acoustic coupling. At the time that CONTROLLER 10 is triggered, the same trigger voltage is applied to the base of TRANSISTOR SWITCH 8 allowing it to conduct and discharge the TIMING CAPACITOR 9 which action continuously extends the output pulse width of CONTROLLER 10 beyond the duration of the "ring".

When CONTROLLER 10 is triggered, its positive square-wave output pulse is applied via CAPACITOR 25 to trigger terminal of the MAIN SYSTEM TIMER 26. Due to the differentiating circuit a required negative-going spike triggers the MAIN SYSTEM TIMER 26 and it commences its predetermined timing cycle coincidental with the trailing edge of the CONTROLLER 10 output pulse.

When the MAIN SYSTEM TIMER 26 is thus triggered, following the first "ring" its output switches to high level. This positive voltage "turns on" TRANSISTOR POWER SWITCH 33, which in turn provides anode voltage to SCR SWITCH 32 and at the same time supplies positive gating to one input of AND GATE 28. This action allows the channel "B" TRANSISTOR BLANKING SWITCH 29 to conduct and the channel "B" controller circuit is thereby enabled to respond if an answer to the "ring" occurs. It will now be obvious to the reader that each time a "ring" occurs, NOR GATE 40 will provide a blanking pulse via AND GATE 28 to disable channel "B". However, in between each "ring" channel "B" is operational and receptive to an answered response. Thus, it can be seen that the system is placed in its ALERT MODE following the initial "ring" under which condition either channel is enabled to respond if an input signal is present. Both channels are not allowed to operate at the same time and this feature will be dealt with in more detail later.

As outlined above, when the MAIN SYSTEM TIMER 26 is triggered, no significant change in the operational function occurs except that the channel "B" controller circuit is enabled to react to an answered response to the "ring". Also, SCR SWITCH 32 was made receptive to a gating pulse that would be applied thereto from the channel "B" controller circuit in the event of an answer. It would be noted by reference to FIG. 1 that the SCR SWITCH 32 is connected in the system such that when power is supplied to its anode by the action of the MAIN SYSTEM TIMER 26 via TRANSISTOR POWER SWITCH 33 and if a gating pulse is provided to the SCR SWITCH 32, it will enable the ELECTRO-MECHANICAL ACTUATOR 1 to place the telephone off-hook. In other words, the telephone "ring" sequenced the system from its STANDBY MODE to the ALERT MODE at which time a voice-reply signal would effectively place the telephone off-hook and both channels would be fully operational. If no answer to the "ring" occurs, the MAIN SYSTEM TIMER 26 will time out and reset the system following the last "ring".

Summarizing the ALERT MODE; (a) the telephone is maintained on-hook. (b) the channel "A" amplifier and controller circuit is fully operational. (c) the channel "B" amplifier and controller circuit is enabled to accept an answered response to a "ring". (d) the main system timer commences its timing cycle. (e) ancillary devices, such as a radio transceiver is switched from receive to transmit conditions each time a "ring" occurs, such that the "ring" is transmitted to a remote operator and the said remote operator is enabled to respond and be connected to the land line.

TALK MODE

When the system is placed in its ALERT MODE, as described above, channel "B" is thereby made responsive to a voice-reply via channel "B". The answer can be made by the called subscriber either direct to the MICROPHONE 41 or through accoustic coupling, from a remote station.

When a called subscriber answers, the resultant output signal from channel "B" AMPLIFIER 42 is applied to TRANSISTOR TRIGGER SWITCH 31, which in turn triggers channel "B" primary CONTROLLER 38 and via DIODE 14 to trigger the sequential time delay circuit consisting of CONTROLLER 19 and CONTROLLER 37.

Now let us consider in detail the action resulting from the triggering of these channel "B" controllers. When primary CONTROLLER 38 is triggered, its output switches from low to high level. The positive pulse thereby produced is applied through DIODE 35 to the gate of SCR SWITCH 32, which in turn energizes the ELECTRO-MECHANICAL ACTUATOR 1 to place the telephone off-hook. Also, the said positive output pulse is applied to one input of NOR GATE 7 to blank Channel A since the resultant negative output of NOR Gate 7 is applied to the base of TRANSISTOR BLANKING SWITCH 6. The blanking of channel "A" is maintained for the duration of the output pulse of CONTROLLER 38.

CONTROLLER 19 is triggered at the same time as CONTROLLER 38 and produces a very short square-wave output pulse. This output pulse is differentiated by means of a resistor and coupling capacitor 17. Consequently, CONTROLLER 37 is triggered a short interval after CONTROLLER 38. The positive output pulse thereby produced is applied to NOR GATE 7 and to the base of TRANSISTOR SWITCH 20.

Since positive output pulses are applied to the inputs of NOR GATE 7 from CONTROLLERS 37 and 38, the blanking of channel "A" is assured during the presence of positive output pulses from these channel "B" controllers.

It will now be evident that the short delay time of the CONTROLLER 37 output pulse relative to that of CONTROLLER 38 provides a means of blanking channel "A" a short interval ahead of the time that SPEAKER 23 is allowed to operate by TRANSISTOR SWITCH 20. The delay is negligible as far as the conversation is concerned but is sufficient to assure that no feedback can occur between channels. As mentioned briefly in the prior text, audio signals applied via the telephone handset microphone, or directly to a telephone line by means of a matching transformer, will also appear as incoming signals so that unless means were provided to decouple the telephone microphone from the handset earphone, interference between channel controllers would result. Without the prior blanking feature, switching indecision and oscillatory action would be evident and the operation of the system would be seriously jeopardized. Also, acoustic feedback would occur at high audio levels.

To hold the device in an operating condition during the period that "rings" or conversation is present, it is necessary to provide means of preventing the MAIN SYSTEM TIMER 26 from timing out. This is accomplished by effectively shorting out the TIMING CAPACITOR 46 of the MAIN SYSTEM TIMER 26, by means of the SCR/LED 24 circuit which is connected across the said timing capacitor. Triggering of the SCR/LED 24 shorting switch is accomplished by the use of AND GATE 27. It will be noted that one input of AND GATE 27 is fed from the output of DIAL TONE DECODER 21. This decoder provides a positive output when no dial tone frequency is present. Since the other input of AND GATE 27 is connected to the output of OR GATE 39, a positive output at the OR GATE 39 will gate the SCR/LED 24 shorting switch to interrupt the nominal timing cycle of the MAIN SYSTEM TIMER 26. Reference to FIG. 1 will indicate that the OR GATE 39 is controlled by the output pulses from channel "A" CONTROLLER 10 and also from channel "B" CONTROLLER 38. Thus it is evident that the presence of audio signals in either channel will cause an interruption of the predetermined time cycle of the MAIN SYSTEM TIMER 26 which is not allowed to time out and reset the system until after all conversations, or unanswered "rings" cease.

The system would be impractical if means were not provided to extend the output pulse widths of CONTROLLERS 10, 37, and 38 during periods that audio output signals are present in the amplifiers connected thereto. As outlined previously, when a "ring" occurs the output pulse of the channel "A" primary CONTROLLER 10 is thereby extended by the clamping action on the timing CAPACITOR 9 by TRANSISTOR SWITCH 8. By this same method, TRANSISTOR SWITCHES 18 and 34 discharge timing CAPACITORS 36 and 44 respectively since audio signals in channel "B" cause these switches to conduct by virtue of the audio-induced trigger pulse provided by TRANSISTOR TRIGGER SWITCH 31.

Thus, during a "ring" or incoming telephone conversation, the channel "A" primary controller output pulse is continuously extended and conversely, during an outgoing telephone conversation the channel "B" CONTROLLERS 37 and 38 are similarly affected and their respective pulse widths are continuously extended until such a time as their related audio amplifiers are quiescent. Also, the MAIN SYSTEM TIMER 26 is prevented from completing its predetermined timing cycle until all audio signals in either channel have ceased.

It should be pointed out that the above described method of interrupting the nominal charging rates of the respective timing capacitors, by means of audio triggering and consequent actuation of capacitor shorting switches, provides means whereby the monopulse RC timer integrated devices, illustrated in FIG. 1, are allowed to continuously extend their respective pulse widths without the necessity of resetting. By this method there is no discontinuity of the output pulse widths since by the method hereby disclosed, the said timers, which are multivibrator-like devices, are not required to flip flop at the end of the predetermined pulse widths. If the pulse widths were not continuously extended and if the controllers were allowed to reset while a conversation was in progress, an undesirable break up of the conversation would be evident.

It is now opportune to discuss certain refinements of the control circuitry, that have been made an integral part of this invention. By reference to the control pulses illustrated in FIG. 3, it will be noted that the channel "A" nonoperating or blanked period is somewhat longer than the channel "B" operating period. Also, the channel "B" operating period commences a slight interval after channel "A" is blanked. Thus SPEAKER 23 is prohibited from operating until after channel "A" is blanked and by the same token SPEAKER 23 is "turned off" prior to the time that the channel "A" blanking is removed.

This method of delay and blanking interlocks the operation of the channels in such a manner that various types of interference both electrical and acoustic, between the channel amplifiers and controllers is virtually impossible. Hence the reliability and versatility of the device is considerably enhanced.

Summarizing the TALK MODE: (a) the telephone is in the off-hook condition. (b) the channel "A" amplifier and related controllers are fully operational. (c) the channel "B" amplifier and related controllers are also fully operational. (d) the main system timer is in its voice-extended delay cycle.

LISTEN MODE

After a call has been answered and the device thus placed in its TALK MODE, the system, at that time, became fully operational for both incoming and outgoing telephone conversations.

Now let us consider in detail what happens when the person who originated the call responds to the answer from the called subscriber. When the person who initiated the call speaks, a signal is detected by the INDUCTION PICK-UP 22, since the telephone is by then off-hook. This signal is amplified by channel AMPLIFIER 4. The effect of this voice signal is identical to that of a "ring" as described for the ALERT MODE. However, there are some design features which will now be discussed in more detail.

The output of the channel "A" AMPLIFIER 4 is connected to the base of TRANSISTOR TRIGGER SWITCH 5 which in turn, is connected to ground through TRANSISTOR BLANKING SWITCH 6. When a signal is applied from this channel, TRANSIS- TOR TRIGGER SWITCH 5 thereby triggers CONTROLLER 10 while at the same time it allows TRANSISTOR SWITCH 8 to conduct and clamp the timing CAPACITOR 9. Coincidental with the first trigger pulse, the CONTROLLER 10 output high level pulse occurs and is continuously extended while audio signals are applied to TRANSISTOR TRIGGER SWITCH 5.

The trigger occurs immediately upon receipt of an audio output signal from the related amplifier and the triggers continue during the presence of the said audio signals. However, once CONTROLLER 10 is triggered, subsequent trigger pulses are ignored until the said controller is allowed to reset. The controller can reset only when its charging capacitor reaches its threshold voltage, which in the case of the type 555 integrated circuit illustrated in FIG. 1, is ⅔ of the supply voltage. Thus it can be seen that the clamping action of TRANSISTOR SWITCH 8 prohibits the charging capacitor from reaching the threshold voltage, during the presence of audio signals applied to its related circuit. Consequently, the output pulse of CONTROLLER 10 is maintained at its high level, to a point in time slightly beyond the period of conversation from the calling party.

By this same method the channel "B" CONTROLLERS 37 and 38 are maintained at their high level output during the presence of audio signals from their related channel "B" AMPLIFIER 42, due to the discharging of the timing CAPACITORS 36 and 44 by means of TRANSISTOR SWITCHES 18 and 34 respectively.

When the caller commences a conversation, as noted above, the channel "A" controller circuit provides a positive square-wave output pulse, the duration of which is continuously extended for the duration of the incoming conversation. The opposite channel is thereby blanked, the transmit mode of the ancillary radio transceiver or similar device is actuated and the conversation is transmitted to a remote operator. When this conversation ceases, the channel "A" controller circuit assumes a low level output conditions, channel "B" is thus allowed to become operational and the said radio transceiver is thereby placed in its receive mode. As outlined briefly heretofore, the ancillary radio transceiver, or other similar device, is actuated from its receive to transmit mode by means of the low level/high level switching of the output of CONTROLLER 10 via JACK 12 and the said ancillary device is acoustically coupled by means of SPEAKER 45 and MICROPHONE 41.

When the remote operator of the radio transceiver continues the conversation, the MICROPHONE 41 provides an input signal to channel "B" AMPLIFIER 42 the output of which triggers the channel "B" controller circuit which in turn blanks channel "A" and "turns on" SPEAKER 23, as described in detail for the TALK MODE.

At the time this remote conversation ceases, both channel controllers assume their quiescent low level output condition, the channel "B" SPEAKER 23 is "turned off" by TRANSISTOR SWITCH 20 but either channel is enabled to operate when another audio signal is provided, assuming it occurs prior to the time that the MAIN SYSTEM TIMER 26 would time out if not interrupted.

Whereas for the purpose of describing this invention it was assumed that an ancillary radio tranceiver was interfaced by the invention to a telephone. However, by means of MICROPHONE 41 and SPEAKER 45, a hands-free telephone amplifying system is provided. For such an application, the prior description of sequences is still valid. Also, if desired, the acoustical coupling devices could be eliminated and direct connections to the interface device, both from the ancillary equipment and to the telephone line by means of suitable matching circuits can be made.

However, when ancillary equipment is used in conjunction with this invention which require synchronized automatic switching for incoming and outgoing signals, the channel "B" extended blanking feature, now hereby disclosed, is required. This feature is necessary so that "clicks" that are audible or in the form of electrical impulses, such as occurs during the switching of ancillary equipment, will be blanked out. Otherwise, these unwanted signals would falsely trigger the channel "B" controllers in the same manner as a voiced response. If this condition was allowed, such false signals following a "ring" would place the device in its TALK MODE and the telephone would erroneously be placed off-hook.

To eliminate this deleterious situation, the invention incorporates an additional timer circuit, CONTROLLER 16. It will be noted that it is coupled to the output of CONTROLLER 10 through coupling CAPACITOR 13 which is part of a differentiating circuit. When CONTROLLER 10 is triggered, its output pulse, conditioned by the differentiating circuit, provides a negative-going trigger coincidental with the trailing edge of the CONTROLLER 10 output pulse, which actuates CONTROLLER 16. This actuation of CONTROLLER 16 occurs at the same instant that the ancillary device is switched to its receive mode by CONTROLLER 10. The output pulse of CONTROLLER 16 is relatively short being only of sufficient duration to cover the period of time that the said "clicks" are present. Reference to FIG. 1 will indicate that the output of CONTROLLER 16 is connected to NOR GATE 40. Thus it will be evident that the production of a positive pulse at the output of CONTROLLER 16 will blank channel "A" by means of AND GATE 28 and TRANSISTOR BLANKING SWITCH 29. Since the outputs of the channel "A" CONTROLLERS 10 and 16 are each connected to an input of NOR GATE 40 it can now be readily seen that the blanking of channel "B" covers the period that audio signals are present in channel "A" plus the period that switching of ancillary equipment takes place.

Summarizing the circuit conditions for the LISTEN MODE: (a) the telephone is off-hook. (b) the channel "A" and "B" amplifiers and related controller circuits are operational. (c) the main system timer is operating on a voice-controlled timing cycle. (d) ancillary equipment will automatically be switched from its receive to transmit mode in synchronism with channel "B" or "A" signals respectively. It should be noted that whereas both channels are fully operational, only channel "A" or "B" can provide audio outputs at a time, on a priority basis.

RESET MODE

When all conversation ceases and there is no output signals from either cahnnel "A" or "B" amplifiers, the MAIN SYSTEM TIMER 26 is then allowed to complete its predetermined cycle, without interruption. Consequently, approximately 12 seconds after cessation of voice signals the output of the MAIN SYSTEM TIMER switches to its low level, by its multivibrator-like action. At that time TRANSISTOR POWER SWITCH 33 removes the positive supply voltage from SCR SWITCH 32 and the telephone ELECTRO-MECHANICAL ACTUATOR 1 places the telephone on-hook. Also, the channel "B" TRANSISTOR BLANKING SWITCH 29 becomes nonconductive due to the negative voltage provided by the MAIN SYSTEM TIMER 26 through AND GATE 28. In this way the channel "B" controllers are blanked and the SPEAKER 23 is inoperative. Under these conditions, since the channel "B" CONTROLLERS 37 and 38 outputs are at low level, a high level output is present at NOR GATE 7 and the channel "A" TRANSISTOR BLANKING SWITCH 6 is in a conductive state. Thus, channel "A" amplifier and controller circuit is fully operational.

The device is thus returned to its STAND-BY-MODE, ready for the next "ring".

Since the miniature SPEAKER 23 used in the transducer coupling circuit has a limited power capability, a means is provided to limit the peak-to-peak audio signals applied thereto. By reference to FIG. 1, it will be noted that two LIGHT EMITTING DIODES 43 are connected, anode to cathode, in parallel across the output of the channel "B" AMPLIFIER 42. When the threshold voltage of these LED's is reached, they conduct and glow. As the voltage increases, the current through the LED's also increases to maintain a relatively constant peak-to-peak voltage across them. This constant peak voltage is within the nominal operating range of most miniature speakers. Whereas zener diodes would perform this function, the LED's provide the added advantage of providing a visual indication which is useful during adjustment for the correct audio level.

EXTERNAL OVERRIDE FEATURE

JACK 11 and normally closed SWITCH-JACK 2 are provided to respectively permit signals from ancillary devices to override the initial triggering and the telephone on-hook actuating circuits, heretofore described.

When ancillary devices are connected to this invention, and is they are provided with commonly used encoding and decoding circuits, a remote operator can initiate a land line call by applying a triggering pulse for the channel "A" CONTROLLER 10 via JACK 11, thence place the telephone off-hook by an audio signal coupled to the channel "B" AMPLIFIER 42 by means of MICROPHONE 41. A TOUCH TONE, a registered trademark system could perform the dialing function.

If a called subscriber answered the call, the automatic sequences, heretofore described would prevail. However, if the call was not answered, the said remote operator could abandon same by a switching arrangement incorporated into the auxillary device connected thereto, through SWITCH-JACK 2.

Whereas the circuit configuration detailed on the schematic diagram of FIG. 1 is used to describe the features and is a practical application of this invention, it is realized that a person skilled in the art could replace various components with improved items, as they become available. Such modifications can be made as the state of the art improves, without departing from the spirit and scope of this invention.

What I claim is:

1. An audio actuated communication interface system to provide for two-way audio communication between a conventional telephone set connected to a telephone line and a station remotely located from the telephone set, said system eliminating manual actuation of said telephone set, comprising:

first channel circuit means coupled to said telephone line for transmitting an audio signal from said telephone line to said remote station;

second channel circuit means coupled to said telephone line for transmitting an audio signal from said remote station to said telephone line;

a main system timing means connected to said first and second channel circuit means for deactivating said first and second channel circuit means after a predetermined time in the absence of audio signals on said first and second channel circuit means;

a ring sensing means connected to said first and second channel circuit means for activating said main signal timing means and for deactivating said second channel circuit means during each ring;

means for activating said second channel circuit means between rings connected to said first channel circuit means and said second channel circuit means;

audio signal responsive means connected to said second channel circuit means and said telephone line for for placing said telephone set in an off-hook condition when an audio response is received on said second channel circuit means between rings;

means for deactivating said first channel circuit means whenever an audio signal is present on said second channel circuit means;

means for deactivating said second channel circuit means whenever an audio signal is present on said first channel circuit means;

means for placing said telephone set in an on-hook condition whenever an audio signal is not present on either said first or second channel circuit means for a predetermined period of time, said means for placing said telephone set in an on-hook condition being connected to said main system timing means;

first channel circuit controller means for generating a first control signal connected to said first channel circuit means activated by an audio signal on said first channel circuit means;

second channel controller means for generating a second control signal connected to said second channel circuit means activated by an audio signal on said second channel circuit means;

means for deactivating said first channel circuit means for a short interval of time prior to the activation of the output of the second channel circuit means connected to said second channel circuit means and said first channel circuit means;

means for extending the first control signal from said first channel circuit controller means for a predetermined short period after the termination of an audio signal on said first channel circuit means; and means for extending said second control signal from said second channel circuit controller means for a predetermined short period after the termination of an audio signal on said second channel circuit means.

2. An audio communication interface system as in claim 1, including:

means for delaying the activation of said second channel circuit means until after said first channel circuit means is deactivated.

3. An audio communication interface system as in claim 2, wherein at least one of said channel circuit control means includes:
  charging means connected to at least one channel circuit controller means for resetting said control means upon a threshold charge on said charging means; and
  switching means responsive to an audio signal on said channel circuit means connected to said charging means for inhibiting said charging means from reaching said threshold charge whenever an audio signal is present on said channel circuit means.

4. An audio communication interface system as in claim 3, wherein said channel circuit controller means includes:
  a monostable multi-vibrator.

5. An audio communication interface system as in claim 2, wherein said main system timing means includes:
  a pulse generating means;
  a charging means connected to said pulse generating means for resetting said pulse generating means upon a threshold charge on said charging means; and
  switching means responsive to the absence of an audio signal on said first channel circuit means and said second channel circuit means, connected to said charging means for inhibiting said charging means from reaching said threshold voltage whenever an audio signal is present on either said first channel circuit means or said second channel circuit means.

* * * * *